US011967252B2

(12) United States Patent
Scioli et al.

(10) Patent No.: US 11,967,252 B2
(45) Date of Patent: Apr. 23, 2024

(54) SYSTEM FOR AND METHOD OF TRAINING

(71) Applicants: Joseph Keith Scioli, Houston, TX (US); Courtney Nicole Bier Scioli, Houston, TX (US)

(72) Inventors: Joseph Keith Scioli, Houston, TX (US); Courtney Nicole Bier Scioli, Houston, TX (US)

(73) Assignee: SYNCRONO TECH, INC., Houston, TX (US)

( * ) Notice: Subject to any disclaimer, the term of this patent is extended or adjusted under 35 U.S.C. 154(b) by 0 days.

(21) Appl. No.: 17/856,214

(22) Filed: Jul. 1, 2022

(65) Prior Publication Data
US 2023/0005381 A1 Jan. 5, 2023

Related U.S. Application Data

(60) Provisional application No. 63/218,249, filed on Jul. 2, 2021.

(51) Int. Cl.
*G09B 5/06* (2006.01)
*G11B 27/022* (2006.01)

(52) U.S. Cl.
CPC ............ *G09B 5/065* (2013.01); *G11B 27/022* (2013.01)

(58) Field of Classification Search
CPC ................................ G09B 5/065; G11B 27/022
USPC ............................................................ 434/169
See application file for complete search history.

(56) References Cited

U.S. PATENT DOCUMENTS

| | | | | |
|---|---|---|---|---|
| 2003/0220973 | A1* | 11/2003 | Zhu ..................... | H04L 12/1831 709/205 |
| 2010/0081116 | A1* | 4/2010 | Barasch ............. | G09B 19/0038 434/308 |
| 2018/0272220 | A1* | 9/2018 | Glorioso ................ | A63B 69/36 |
| 2020/0081741 | A1* | 3/2020 | Mitsugi ................. | G06F 12/126 |
| 2020/0185006 | A1* | 6/2020 | Tene ..................... | G11B 27/102 |
| 2020/0365047 | A1* | 11/2020 | Grande ................. | G09B 5/065 |
| 2020/0379810 | A1* | 12/2020 | Dalmia ................. | G06F 9/5022 |
| 2022/0335849 | A1* | 10/2022 | O'Day ............... | H04L 65/4015 |

* cited by examiner

*Primary Examiner* — Jay Trent Liddle
*Assistant Examiner* — Alyssa N Brandley
(74) *Attorney, Agent, or Firm* — Kutak Rock LLP; Ryan S. Hinderliter (57) ABSTRACT

A system for and method of instruction is provided. A user initiates a lesson with an instructor which begins a video call. During the video call, the instructor records one or more recording of the user and edits the recording with mark-up, which can then be played back to the user to aid in the instruction. Each of the video call, the recording, and the mark-up are recorded as an independent recording layer, while the entire lesson is also recorded. The system and method utilize recording techniques so as to not deplete the resources of the user devices. Upon conclusion of the lesson, the recording of the lesson and each layer is provided to the users.

18 Claims, 8 Drawing Sheets

SYSTEM FOR AND METHOD OF TRAINING

CROSS-REFERENCE TO RELATED APPLICATION

This application claims priority to U.S. Provisional Application Ser. No. 63/218,249, filed Jul. 2, 2021, the entire disclosure of which is incorporated herein by reference.

FIELD OF THE INVENTION

The present invention relates generally to virtual training platforms. More specifically, the present invention is concerned with providing live replay review and coaching in a virtual environment.

BACKGROUND

Golf is one of the top recreational activities in the United States. Many golfers desire lessons from professional golfers to help improve their fundamentals and ultimately their scores. Oftentimes, these 'pros' are Pro Golf Association (PGA) certified instructors who are highly sought after for lessons. When scheduling golf lessons with a PGA certified instructor, three things must align: One, a golfer must be able to find an instructor in the golfer's geographic area; Two, the price point must be affordable for the amateur golfers; and Three, the golfers' schedule and the pros' schedule must align in order to book a date/time in advance.

In addition to the recent pandemic, the above issues have contributed to online instruction becoming a rapidly growing industry in the game of golf. Platforms such as YOUTUBE and ZOOM allow golfers to seek guidance from reputable sources on how to improve their game. Other offerings allow golfers to submit videos of their swings for a certified pro to review, make notes on and send back to the player. Current applications that provide these virtual lessons only allow for submission of replays which are then reviewed by pros at a later time. However, this misses a critical aspect of golf instruction, that being the live, real-time component to instruction, especially as it pertains to mechanical issues which may be intermittent in a golfer's swing. Accordingly, it would be advantageous to provide online instruction which facilitated an instant live model, wherein pros could record and replay golfer's swings in real-time.

Moreover, because of the hurdles in scheduling a lesson with a pro, providing this real-time instruction and golf lessons from a certified instructor whenever and wherever golfers choose is a convenience that is a long-felt need in the sport of golf. Accordingly, it would be advantageous to provide a system and method for on-demand, real-time, layered, and replay able golf lessons from a certified instructor.

Similar to golfer's seeking lessons, certified instructors face difficulties related to in-person lessons. Student cancellations are frequent and leave the instructor unable to fill the now vacant time slot. Moreover, in-person lessons give rise to the possibility of being unable to conduct lessons due to weather. Certified instructors also face difficulties in marketing, as oftentimes golfers are unaware of the services provided by local instructors and of the specific areas in which the instructor specializes. This leads to an overall lack of brand awareness. Where the instructor is unable to conduct lessons for reasons outside of their control, their income suffers. Accordingly, it would be advantageous to provide a system and method for instructors to use which allowed for on-demand lessons which avoid the aforementioned pitfalls associated with current in-person lessons.

Currently, online instruction platforms only provide functionality that allows for interaction between golfer and instructor on a single-layer recording level. Oftentimes, this single layer recording is either a live, face to face chat or a pre-recorded video of the golfers swing and the follow-up analysis from the instructor. However, instruction in a virtual environment proves significantly more useful when the golfer and the instructor can utilize multiple layers of input and recording. This would provide the ability for the golfer and the instructor to be in a live lesson layer while simultaneously discussing a recorded video layer while the instructor provides another layer of information by diagramming on top of the video layer. Such multi-layered interactions are oftentimes extremely resource-intensive and are oftentimes precluded by the hardware utilized by the golfer or the instructor. Accordingly, it would be advantageous to provide a multi-layer environment which is efficient enough to be compatible with the wide range of hardware typically utilized by golfers and instructors.

SUMMARY

The present invention comprises a system for and method of providing instruction to golfers. A platform is provided to each of a golfer, an instructor (or pro), and an admin (each a "user") which serves to store, transfer, and augment data which serves to facilitate an on-demand, live golf lesson. The platform is presented to the user in the form of a software application running on one or more device, connected through one or more data connection to a central server, a device of another user, both, or other additional devices. The platform enables golfers and instructors to register an account, engage in on-demand lesson or schedule a lesson, interact in real-time with one another, record clips (videos, layers) during a live trainings session, edits the clips during the live session, replay the clips during the live session, finish the session, and view a replay of the session.

Advantageously for the golfer, this system solves the problem of finding, scheduling, and taking golf lessons with a certified instructor as the instruction is now on-demand and the interaction is live. Moreover, the golfer can access the platform from any location and on any device. The instructor advantageously overcomes the problems of cancellations, weather, and marketing, as the instruction is on-demand and the interaction is live. The instructor also has the ability to accept or reject lesson requests and to view a student's profile to determine whether the student's level of expertise is a match for the instructor's level of expertise. From a technological perspective, the platform provide a layer management module which advantageously provides for multiple layer environment lessons without interruptions in connectivity or performance.

The layers work by providing a video call between a golfer and instructor, wherein the instructor can share a recording of the golfer's swing or body position with the golfer while maintaining the live video call. The instructor can also provide mark-up on the recording, which is then saved along with the recording. The entire lesson is saved as a lesson layer, which includes the video call, recording, and mark-up. The golfer can then replay the lesson layer to view the recording and mark-up. The layer management module monitors system resources during this process to allocate, prioritize, initiate, and terminate various tasks and layers as necessary to ensure a smooth lesson performance.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

Exhibit A includes various documents which provide information relevant to the present invention.

DETAILED DESCRIPTION

A system for and method of providing instruction is provided. The present disclosure provides an exemplary use case of golf instruction for the system and method, however one ordinarily skilled in the art would readily understand that the system and method herein are applicable to a variety of teaching and instruction environments A platform is provided to each of a golfer, an instructor (or pro), and an admin (each a "user") which serves to store, transfer, and augment data which serves to facilitate an on-demand, live golf lesson. The platform is presented to the user in the form of a software application running on one or more device, connected through one or more data connection to a central server, a device of another user, both, or other additional devices. The platform enables golfers and instructors to register an account, engage in on-demand lesson or schedule a lesson, interact in real-time with one another, record clips (videos, layers) during a live trainings session, edits the clips during the live session, replay the clips during the live session, finish the session, and view a replay of the session.

The platform includes a golf lesson session management system which organizes, schedules, and coordinates live golfing sessions between instructors and students. The session management system facilitates real-time video streaming, recording, and playback of the golfing session, as well as text messaging, file sharing, and other forms of communication and interaction between the instructor and the student.

The platform also includes a golf swing analysis system which analyzes the student's golf swing and provides feedback to the student in real-time. The swing analysis system uses video capture and analysis techniques to identify the student's swing faults and recommend corrective actions.

The platform further includes a golf training aids system which provides the student with training aids, such as video lessons, swing drills, and practice routines. The training aids system includes a library of pre-recorded video lessons, swing drills, and practice routines. The training aids system also includes a lesson builder tool which allows the student to create custom video lessons, swing drills, and practice routines.

The platform also includes a payment processing system which processes payments for golf lessons, training aids, and other services. The payment processing system includes a payment gateway which allows the student to pay for lessons, training aids, and other services using a credit card, debit card, or other payment method. The payment processing system also includes a subscription management system which manages the student's subscription to the platform.

The platform also includes an administrative panel which allows an administrator to manage the platform. The administrative panel includes a user management system which allows the administrator to add, delete, and modify users. The administrative panel also includes a subscription management system which allows the administrator to manage the student's subscription to the platform.

Figure 1:
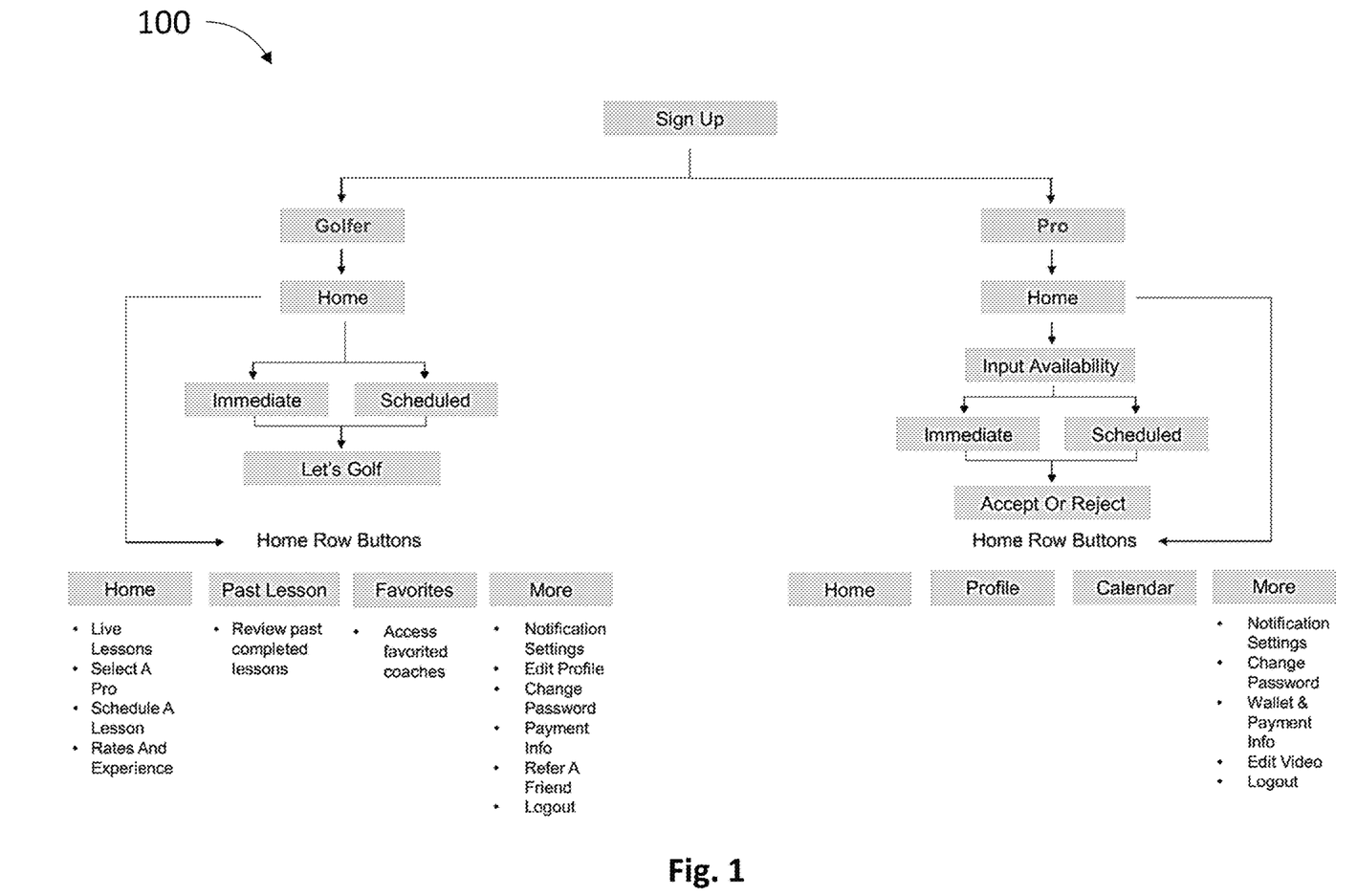
FIG. 1 is a diagram providing an overview of a platform, according to some embodiments of the present invention.
Figure 2A:
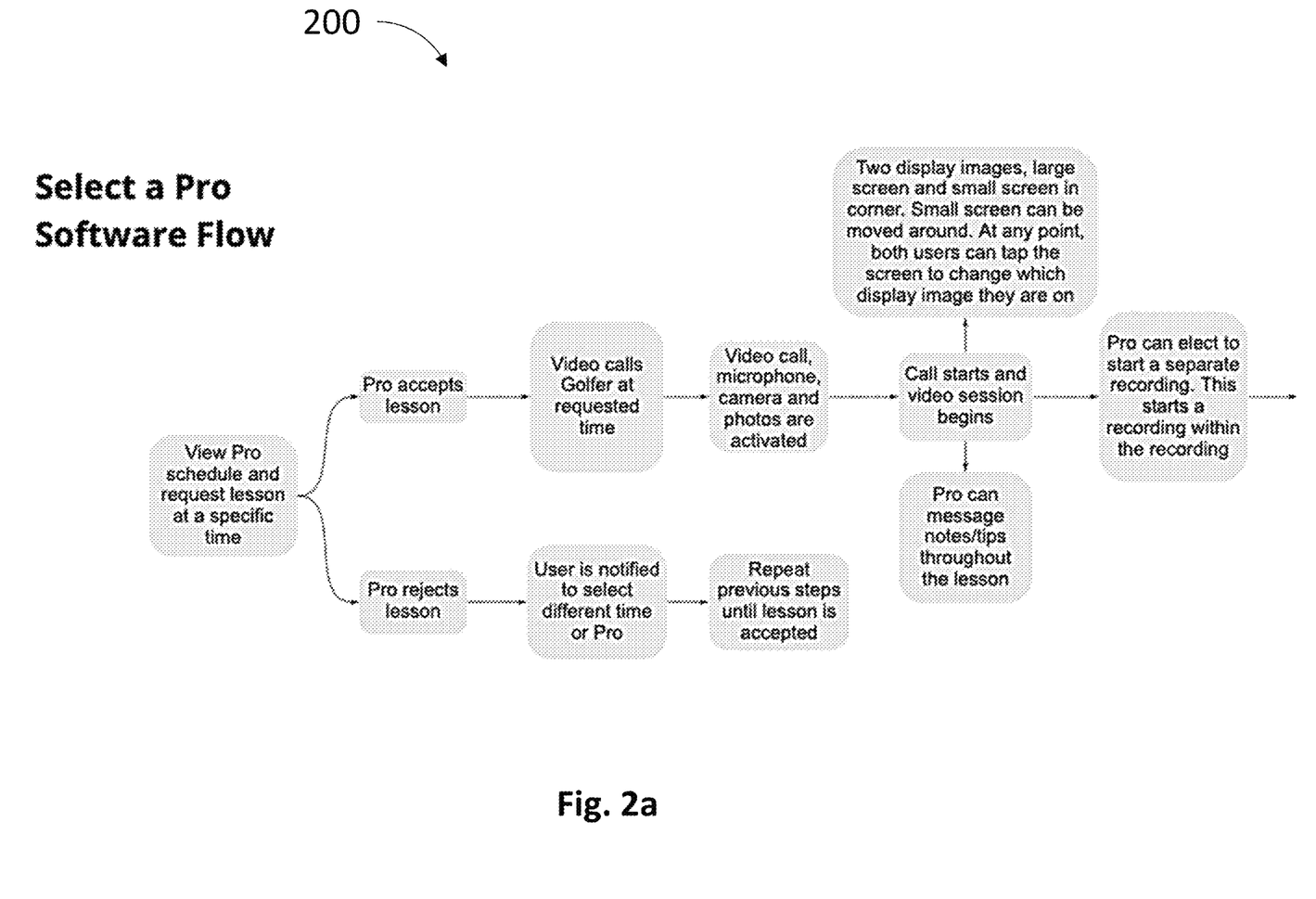
FIGS. 2a and 2b are a flowchart showing the selection of a pro, according to some embodiments of the present invention.
Figure 2B:
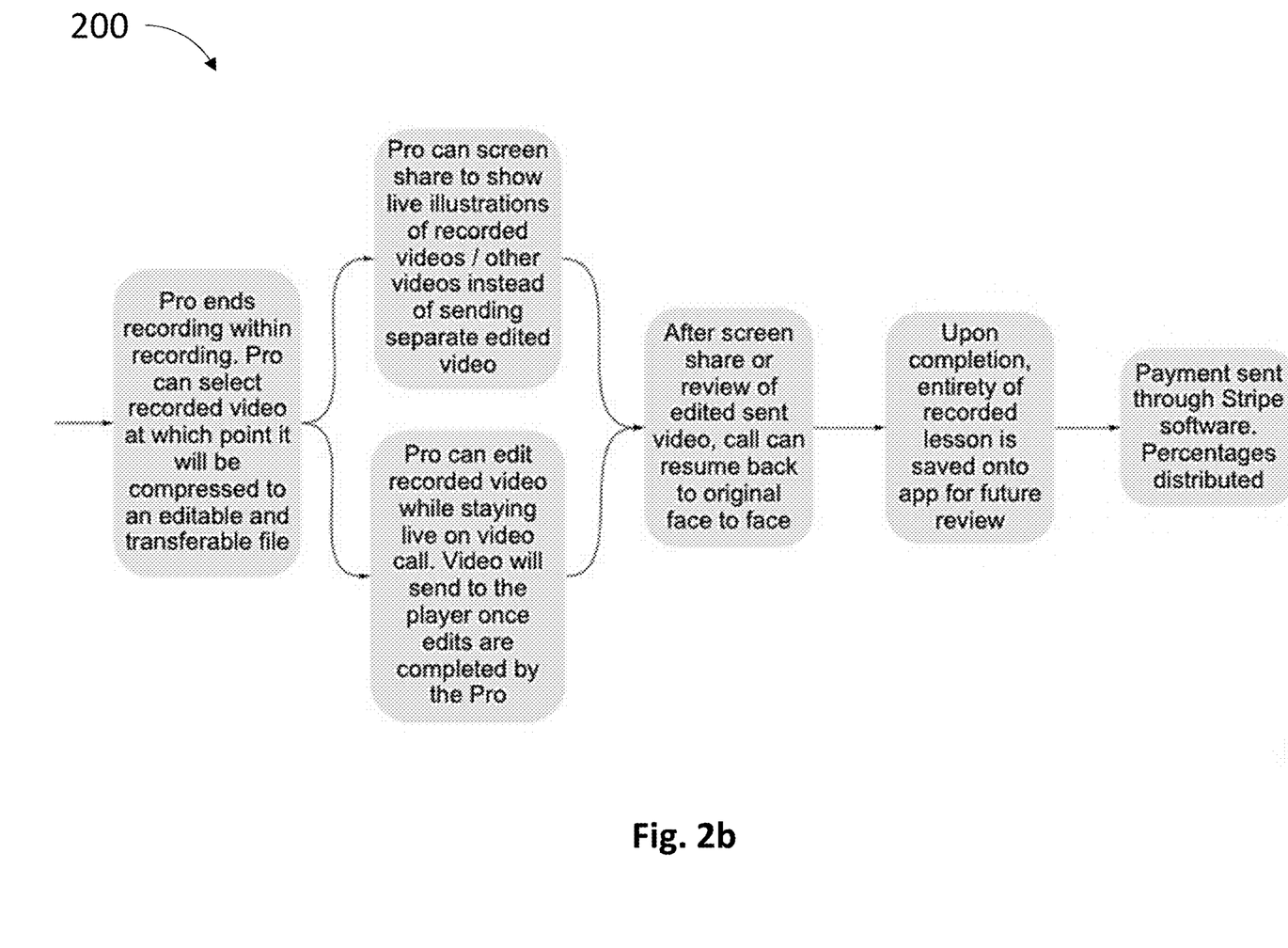
Figure 3A:
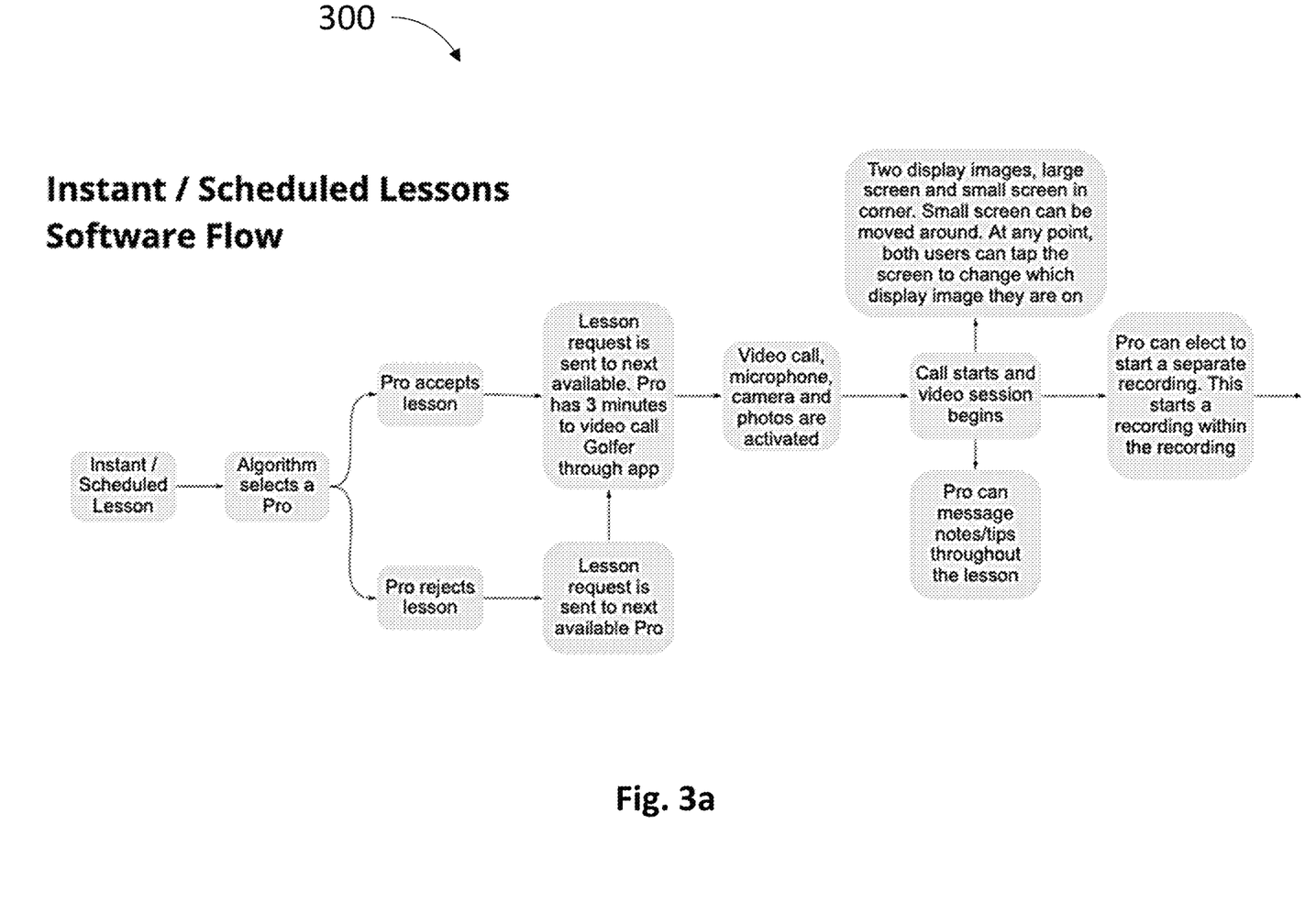
FIGS. 3a and 3b are a flowchart showing the initiation of a lesson, according to some embodiments of the present invention.
Figure 3B:
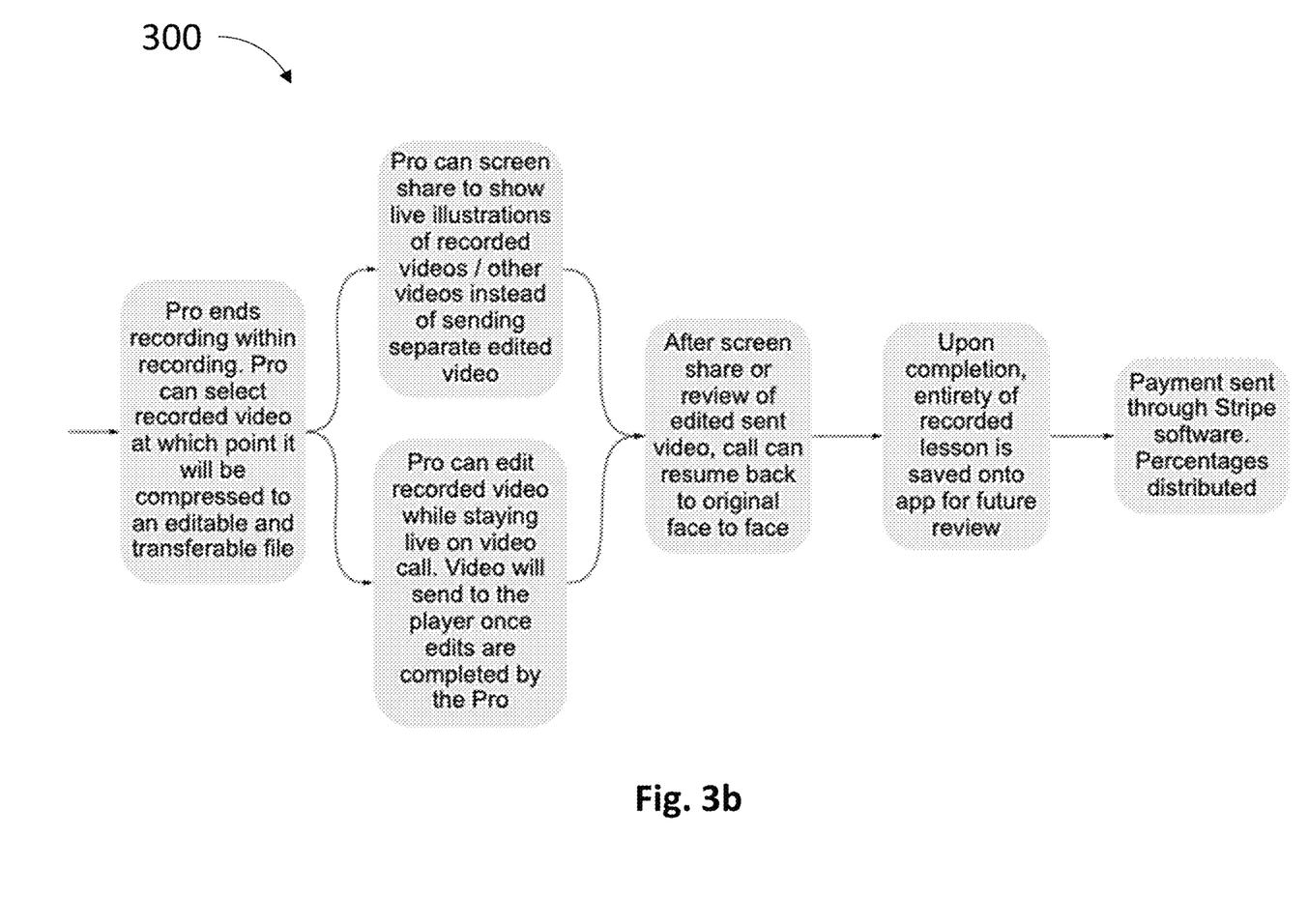

Referring to FIG. 1, The platform includes a sign-up portal. At the sign-up portal, a user can identify themselves as a golfer (student) and/or a pro (instructor). If the user identifies as a student, they are provided with an intake page which enables the user to complete a profile. The profile includes personal information such as name, age, gender, email address, mailing address, and other personal information. The profile also includes information about the user's golf skills, including their age group, gender, handicap, and other relevant information. If the user identifies as a pro, they are provided with an intake page which enables the user to complete a profile. The profile includes personal information such as name, age, gender, email address, mailing address, and other personal information. The profile also includes information about the user's golf skills, including their age group, gender, handicap, and other relevant information. In addition, the profile includes information about the user's teaching skills and experience. Further, the user's availability is listed on the profile.

After the user completes their profile, a student user is given the opportunity to search for a golf instructor. The search includes the option to filter instructors by location, skill level, and other criteria. Further, the search can be either for a scheduled or on-demand lesson. Once the user finds an instructor that they are interested in, they can view the instructor's profile. The instructor's profile includes information about the instructor's teaching experience, skills, and ratings. In addition, the instructor's profile includes a list of the instructor's students. For an on-demand lesson, the user is simply provided with a prompt of the skills the user would like to work on at this time. Based on this, and other profile information, the platform automatically pairs the student with the best available instructor at this time.

Both instructor and student users are presented with a home portal within the platform. For the student user, the home portal includes all of the options to schedule a lesson. The home portal also includes information as to lesson rates, favorited coaches, and various settings of the app. Further, the home portal enables access to prior lessons. For the instructor user, the home portal includes a calendar of all scheduled lessons, information on lesson rates, and a roster of students. In addition, the home portal includes favorited students, settings of the app, and access to prior lessons.

Referring to FIGS. 2a-b and 3a-b, in some embodiments, scheduling a lesson begins with a user interacting with a device which enables access to the platform. In some embodiments, the device is a mobile device with a user interface and one or more peripherals (such as a user input implement, a camera, a microphone, or the like) for intaking at least one form of data. In some embodiments, the user utilizes the device to provide a user input, the user input typically being a button press or interaction with a touch-screen which simulates a button press. In some embodiments, the interaction begins a lesson request. In some embodiments, the lesson request includes selecting a lesson timing type (on-demand/instant or scheduled).

In some embodiments, where an on-demand lesson is selected, one or more algorithm is utilized to identify an instructor for performing the on-demand lesson. In some embodiments, the algorithm is running on a user device, while in other embodiments the algorithm is running on a server in data communication with one or more user device. In some embodiments, the algorithm utilizes one or more data piece to select an instructor, such as, but not limited to, user location, user availability, user rating, user specialty, user age, user time factor, user issue, user preference, user history, and the like. In some embodiments, the algorithm identifies a single instructor or user to perform the instruction. In some embodiments, the algorithm provides an ordered list of one or more instructor to perform the lesson. In some embodiments, the list is ordered by most-preferred instructor to lesser-preferred instructor. In some embodiments, once a pro has been selected or a list generated, the platform provides a notification to the selected instructor or the instructor at the top of the ordered listed. The instructor is given the opportunity to accept or reject a lesson request. In some embodiments, the instructor accepts the lesson and is given a time frame to begin the on-demand lesson. If the on-demand lesson is not started within the given time frame or the instructor rejects the lesson, then the platform selects another alternative (secondary) instructor to perform the lesson. In some embodiments, the alternative instructor is selected by performing the algorithm again, while in some embodiments the alternative instructor is selected by identifying the next preferred instructor in the ordered list. In some embodiments, the instructor notification and alternative instructor selections continue until an instructor accepts the on-demand lesson and begins the lesson within the given time frame.

In some embodiments, where a scheduled lesson is selected, the user beings a lesson scheduling process. In some embodiments, the user is presented with a list of instructors to select from for the scheduled lesson. In some embodiments, the list is of all instructors, while in some embodiments the list is curated by one or more algorithm or process of the system. In some embodiments, the user is provided a filter for the list of instructors. The user identifies an instructor and time for the lesson and confirms that the lesson should be scheduled. In some embodiments, the selected instructor is notified of the lesson and is given the option to accept or reject the lesson. Where the instructor accepts the lesson, the instructor begins the lesson at the scheduled time. Where the instructor rejects the lesson, the user is notified that a different instructor must be selected. In some embodiments, the user performs the scheduling process until an instructor accepts the lesson.

Figure 4:
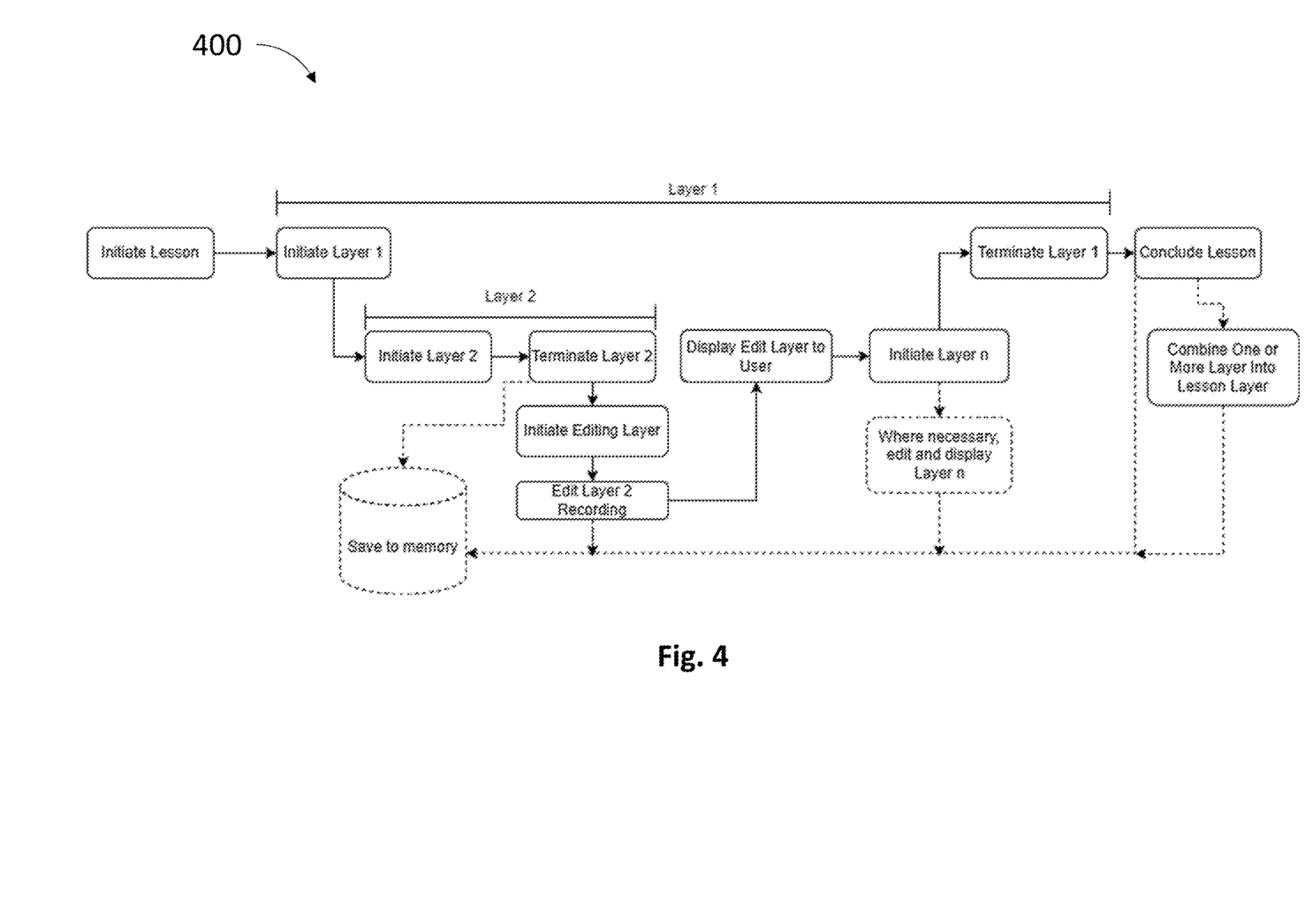
FIG. 4 is a diagram showing the layer creation, editing, and management during a lesson, according to some embodiments of the present invention.

Referring generally to FIG. 4, in some embodiments, the lesson begins with the golfer and instructor engaging in a communication. In some embodiments, this communication is a video call, utilizing one or more peripherals of the user devices. In some embodiments, the video call utilizes a camera and microphone of the user devices. In some embodiments, a call layer, or first layer, is initialized, the first layer displaying and/or recording the video call. In some embodiments, the first layer includes two display images. In some embodiments, the display images are a large screen and small screen. One screen displays a first user, while the other screen displays a second user. In some embodiments, the small screen is positioned within the boundaries of the large screen, such as providing a picture-in-picture style display. In some embodiments, the display images are side by side. In some embodiments, each device displays the two display images. In some embodiments, each user can provide input to the device to change the display images, such as by changing the location of the small image within the boundary of the large image, or by changing which user is displayed on which screen. In some embodiments, the first layer occurs from the start of the communication until the end of the communication. In some embodiments, the first layer audio is recorded. In some embodiments, the first layer video is recorded. In some embodiments, the first layer recording is controlled by one or more of the users and selectively displayed as part of the video call.

In some embodiments, the video call is initiated through the user devices and/or through a platform, such as a mobile application or the like. In some embodiments, the video call is initiated through the platform, and the platform utilizes the user devices to complete the call. In some embodiments, the user devices utilize the platform as a conduit to facilitate the video call.

In some embodiments, the instructor initiates the lesson through the platform, the platform instructing one or more user to begin the call, such as through a notification to one or more user. In some embodiments, the instructor provides a lesson time and the platform provides a notification to the user to start the call at the time of the lesson time. In some embodiments, the instructor initiates the lesson through the platform, the platform initiating the call at the start of the lesson. In some embodiments, the lesson is initiated through the platform, the platform utilizing the user devices to communicate with the instructor and establish the video call at the start of the lesson. In some embodiments, the instructor initiates the lesson through the platform, the platform utilizing the user devices to reach out to the instructor using a communication software.

In some embodiments, the instructor initiates a second layer. In some embodiments, the second layer is a recording of the first layer that takes place after the start of the first layer and before the end of the first layer, creating a recording of the first layer. In some embodiments, the second layer generates a recording which is controlled by one or more user and selectively displayed as part of the first layer. In some embodiments, the instructor utilizes the second layer to record a golfer's swing or body position, which generates a recording (which may also be considered the second layer recording). In some embodiments, the instructor can then share the second layer recording with the golfer while the first layer is on-going. The instructor can then play, pause, reverse, or the like the second layer recording while maintaining live video call with the golfer. The second layer recording is saved independently in association with the lesson and stored in a database. Either user is enabled to access the second layer recording during or after the lesson.

In some embodiments, the instructor can input mark-up or figures on the second layer recording while engaged in the first layer video call. In some embodiments, the mark-ups appear on screen for both users, generating a third layer, or mark-up layer. In some embodiments, the instructor controls the mark-ups, while in some embodiments both users are enabled to provide markups. The mark-up layer is recorded and saved along with the second layer recording. In some embodiments, the mark-up layer is saved in a database, and either user is enabled to access the mark-up layer recording during or after the lesson.

In some embodiments, the instructor can end the first layer communication and begin the second layer recording without ending the second layer recording. In some embodiments, the instructor can enter a second layer by providing input to the device. In some embodiments, the instructor can provide input to the device to begin the second layer recording. In some embodiments, the second layer recording continues until the instructor provides input to the device to end the recording of the second layer. In some embodiments, the second layer recording is saved in association with the lesson in a database, and the instructor and/or golfer are enabled to access the recording during or after the lesson.

In some embodiments, the instructor edits the secondary layer recording and provides mark-up while not sharing the live editing on screen. In some embodiments, the secondary layer recording and the third layer markup are associated with one another in a database and further associated with the lesson. Upon completion of the editing of the second layer recording, the instructor then shares both the second layer recording and the third layer mark-up with the golfer while maintaining the live video call. The golfer then accesses the recording and markup to view the edits made by the instructor while the instructor provides explanations of the edits.

Upon completion of the lesson, the entire lesson is saved as a lesson layer, the lesson layer being recorded during the entirety of the lesson and stored in memory of the device and/or server. In some embodiments, the lesson layer is a replay or recording of the audio and visual provided by the platform during the lesson. In some embodiments, the lesson layer includes the call layer, recording layer, and mark-up layer, along with the audio of the lesson. In some embodiments, the lesson layer displays only the portions of each layer which were present on-screen for a user during the lesson, thus allowing the golfer to replay the lesson with inclusion of each layer of the lesson. In some embodiments, the lesson layer is saved and stored in a database. The user then is enabled to access the lesson layer after completion of the lesson and/or during a later lesson.

In some embodiments, the lesson plan begins with the instructor making a video call to the golfer, utilizing one or more user device peripherals, and initializing a first layer. The instructor then initiates a recording layer and shares the recording with the golfer in real time. The instructor then provides mark-ups on the recording layer, which are displayed for both users. The instructor then saves the lesson as a lesson layer. After the lesson, the golfer accesses the lesson layer to review the lesson.

In some embodiments, during a follow-up lesson, the instructor accesses the lesson layer and provides a second recording and second mark-ups to the golfer in real time. At the end of the follow-up lesson, the instructor saves the second recording and second mark-ups as an update to the lesson layer, which can be accessed by the golfer at any time.

During another follow-up lesson at a later date, the instructor can access the lesson layer and provide a third recording and third mark-ups to the golfer in real time. The instructor then saves the third recording and third mark-ups as an update to the lesson layer, which can be accessed by the golfer at any time. In some embodiments, the lesson plan can continue in this manner, with the instructor providing recordings and mark-ups at each follow-up lesson, which are saved as updates to the lesson layer. The golfer can access the lesson layer at any time to review the recordings and mark-ups.

In some embodiments, the instructor can access the lesson layer and provide a fourth recording and fourth mark-ups to the golfer in real time. The instructor then saves the fourth recording and fourth mark-ups as an update to the lesson layer, which can be accessed by the golfer at any time. In some embodiments, the instructor can access the lesson layer and provide a fifth recording and fifth mark-ups to the golfer in real time. The instructor then saves the fifth recording and fifth mark-ups as an update to the lesson layer, which can be accessed by the golfer at any time.

As noted, current offerings limit the ability to do multiple layer recording. In some embodiments, the layer recording utilizes the native recording of the user devices. In some embodiments, the recording occurs directly on the server, bypassing the need for the user device to record all layers. In some embodiments, the recording is stored in the random access memory of the user device, and subsequently sent to the server for storage or to a storage associated with the device. In some embodiments, the video layer, the recording layer, and the mark-up layer run in random access memory in parallel. In some embodiments, where such parallel running causes resource deficiencies associated with the hardware of the user, the platform instead adjusts to record smaller pieces of the layer multiple times. In some embodiments, this recording is by micro-recording the layer, wherein the recording is non-continuous and the layer is broken up by rapidly recording and not recording adjoining segments of the layer, thus reducing the resource demands while still providing useful layer recording for facilitating the administration of the lesson. Thus, the resource deficiencies related to recording multiple layers noted in the prior art are overcome and an improvement in the technical field and the working of the hardware of the user is achieved.

In some embodiments, two or more user devices with one or more peripherals to receive input from a user. In some embodiments, a management device, such as a server, is utilized to broker or manage a data connection between the plurality of devices. Each device and/or server includes a processor, a memory, and a storage device, configured to execute a lesson that includes one or more layers of a lesson. Each device is operatively connected to a communication interface. The communication interface facilitates communication between the devices and/or server over a communication network, which may be a wired or wireless network. To initiate communication, a user may provide input to one or more of the user devices, which is received by the communication interface. The communication interface then sends the input to the management device, which brokers a connection between the user devices. The connection may be a direct connection between the user devices, or may be indirect, such as through one or more other devices or servers. Once the connection is established, the user devices may exchange data with each other, which may include, for example, text, images, video, audio, or any other type of data. The data is stored in the memory of each device and/or in the storage device. In some embodiments, the data is also sent to the management device, which may store the data in its memory and/or storage device. One or more lesson is performed over the connection, and the lesson is stored in the memory and/or storage device of each device and/or in the memory and/or storage device of the management device. In some embodiments, the lesson is also output to one or more of the user devices, which may output the lesson on a display, speaker, or any other type of output device. The lesson is made up of one or more layer, each layer including content to be presented to the user. The content may include, for example, text, images, video, audio, or any other type of content. Each layer is saved as a file in the memory and/or storage device of each device and/or in the memory and/or storage device of the management device.

One or more database is provided, which stores data associated with the user devices, the management device, and the communication network. The database includes a user device table, a management device table, and a communication network table. The user device table includes data associated with the user devices, such as a device identifier, a communication interface identifier, and a user identifier. The management device table includes data associated with the management device, such as a device identifier, a communication interface identifier, and a user identifier. The communication network table includes data associated with the communication network, such as a network identifier, a communication interface identifier, and a user identifier.

The user devices, the management device, and the communication network may be operatively connected to each other through the communication interface. The communication interface may be a wired or wireless interface. In some embodiments, the communication interface is a Bluetooth interface. In other embodiments, the communication interface is a WiFi interface. In still other embodiments, the communication interface is a cellular interface.

Once the connection is established, the user devices may exchange data with each other, which may include, for example, text, images, video, audio, or any other type of data. The data is stored in the memory of each device and/or in the storage device. In some embodiments, the data is also sent to the management device, which may store the data in its memory and/or storage device. One or more lesson is performed over the connection, and the lesson is stored in the memory and/or storage device of each device and/or in the memory and/or storage device of the management device. In some embodiments, the lesson is also output to one or more of the user devices, which may output the lesson on a display, speaker, or any other type of output device.

Figure 5:
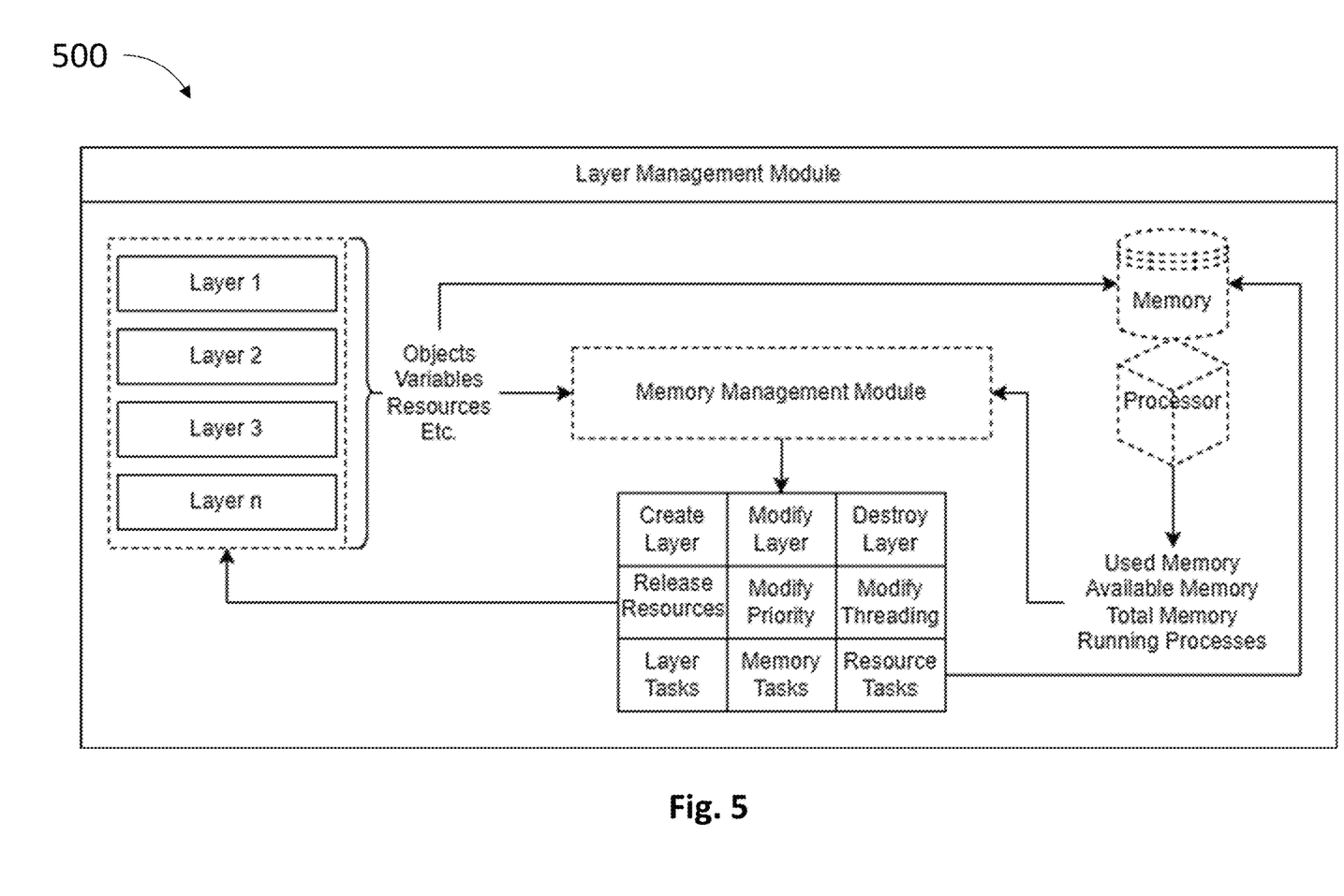
FIG. 5 is a diagram of a layer management module, according to some embodiments of the present invention.

Referring to FIG. 5, in some embodiments, the system and method include a layer management module 500. In some embodiments, the layer management module 500 includes a memory management sub-module. In some embodiments, each of the aforementioned layers is initiated, manipulated, terminated, or otherwise augmented via one or more processor coupled to a memory, the memory containing non-transitory machine-readable code. In some embodiments, the manipulation includes one or more layer management module 500. In some embodiments, one or more layers are initiated, manipulated, terminated, or otherwise augmented via a lifecycle step and/or implementation, or other directive of the processor and/or the layer management module 500. The machine-readable code of some embodiments includes code for initiating, manipulating, terminating, or otherwise augmenting one or more layers of a computing system to provide for a more efficient processing environment.

One example of how the layer management module 500 might be used to initiate, manipulate, terminate, or otherwise augment one or more layers is as follows. In some embodiments, a processor coupled to a memory containing the machine-readable code is configured to receive input from a user. The processor then initiates one or more layers in accordance with the input from the user. For example, if the user input indicates that the user wishes to initiate a video layer, the processor will initiate the video layer in accordance with the machine-readable code. The processor may then manipulate the video layer in accordance with further user input, or in accordance with predefined criteria. For example, the processor may terminate the video layer when the user indicates that they are finished interacting with the video. Alternatively, the processor may terminate the video layer automatically after a predefined amount of time has elapsed or upon the occurrence of one or more event, such as the user navigating to a different page or interface. In some embodiments, the processor may initiate, manipulate, terminate, or otherwise augment one or more layers in response to input from sensors or other devices coupled to the computing system, as necessary to ensure the initiation, manipulation, termination, or otherwise augmentation of one or more other layers of the system by the layer management module 500.

In some embodiments, the machine-readable code is configured to initiate, manipulate, terminate, or otherwise augment one or more layers in response to input from one or more sensors. For example, the machine-readable code may be configured to initiate a video layer in response to receiving input from a camera. The machine-readable code may then manipulate the video layer in accordance with further input from the camera or in accordance with predefined criteria. For example, the machine-readable code may terminate the video layer when the camera detects that the user is no longer in view. Alternatively, the machine-readable code may terminate the video layer automatically after a predefined amount of time has elapsed or upon the occurrence of one or more event, such as the user moving out of range of the camera.

The layer management module 500 further includes a memory management sub-module. The memory management sub-module tracks and utilizes the total system memory, the utilized system memory, the available system memory, and the expected memory utilization of variables, objects, the required services, and the like. The memory management sub-module dynamically identifies which system processes are required for the proper functioning of one or more active layer and which are not, based on one or more input from a user and/or the current state of the lesson at hand. The memory management sub-module then selectively kills, starts, or modifies the priority of system processes as necessary to free up additional memory for the required processes. As one or more layer is initiated by a user, such as a first layer, a second layer, a recording layer, or a modification layer, the memory management sub-module determines if the system has enough available memory to accommodate the new layer. If not, the memory management sub-module takes steps to increase the amount of available memory, such as by killing one or more processes that are not essential to the proper functioning of the system, by starting one or more processes that utilize idle system resources, or by modifying the priority of one or more processes, for example, providing information regarding the expected memory utilization of one or more layer to the layer management module, which can use the information to determine whether or not to initiate a particular layer or if one or more actions need to be taken against existing processes and/or layers prior to initiation to ensure adequate memory utilization. Further, in some embodiments, the memory management sub-module is configured to monitor the system for changes in available memory, utilized memory, and the like, and to provide information regarding such changes to the layer management module. The layer management module and the memory management sub-module ensure that the connection between the devices is not interrupted and further ensures the quality of one or more communication between users of the device during the duration of the lesson.

In some embodiments, the memory management sub-module is continuously cycled throughout a lesson when any layer is active. In some embodiments, the memory management sub-module is configured to determine if the system has enough available memory to accommodate a new layer by accessing a data store including information regarding expectation memory utilization of various types of layers. If not, the memory management sub-module takes steps to increase the amount of available memory, such as by killing one or more processes that are not essential to the proper functioning of the system, by starting one or more processes that utilize idle system resources, or by modifying the priority of one or more processes. For example, the memory management sub-module may provide information to the layer management module 500 indicating that a certain layer should not be initiated due to inadequate available memory. As another example, the memory management sub-module may kill one or more processes, start one or more processes, or modify the priority of one or more processes in order to free up additional memory for the initiation of a new layer. In some embodiments, the memory management sub-module is configured to monitor the system for changes in available memory, utilized memory, and the like, and to provide information regarding such changes to the layer management module. The layer management module 500 and the memory management sub-module work together to ensure that the connection between devices is not interrupted and further ensures the quality of communications between users of the device during the duration of a lesson.

In some embodiments, the layer management module 500 utilizes one or more lifecycle steps for initiating, manipulating, terminating, or otherwise augmenting a layer. In some embodiments, the lifecycle steps control the execution of the one or more steps for controlling the layer. In some embodiments, the lifecycle steps include the initialization of variables, objects and the required services, and/or the clean up of one or more variables, objects and the required services when the necessary execution has been completed. By managing the variables, object, and the required services during the recording, the overall memory and system resource usage is reduced. In some embodiments, the lifecycle steps further include passing information to other modules and/or services for performing their functionality.

In some embodiments, the layer management module utilizes one or more security steps for initiating, manipulating, terminating, or otherwise augmenting a layer. In some embodiments, the security steps include the validation of user input, the sanitization of user input, the encryption of data, and/or the signing of data. In some embodiments, the security steps further include passing information to other modules and/or services for performing their functionality.

In some embodiments, the layer management module utilizes one or more storage steps for initiating, manipulating, terminating, or otherwise augmenting a layer. In some embodiments, the storage steps include the reading from and writing to of files, the reading from and writing to of a database, and/or the reading from and writing to of a data store. In some embodiments, the storage steps further include passing information to other modules and/or services for performing their functionality.

In some embodiments, the layer management module utilizes one or more communication steps for initiating, manipulating, terminating, or otherwise augmenting a layer. In some embodiments, the communication steps include the sending of data, the receiving of data, the broadcasting of data, and/or the multicasting of data. In some embodiments, the communication steps further include passing information to other modules and/or services for performing their functionality.

In some embodiments, the lifecycle of an activity is generally defined by one or more commands, such as the "onCreate" and "onDestroy" commands and routines. For example, these methods may mark the start and end of an activity's lifecycle, respectively. In some embodiments, objects may be initialized in the onCreate method since it guarantees the proper initialization of variables before they are used further ahead in the lifecycle.

In some embodiments, OpenTok Publishers and Subscribers may be initialized for a complete lifecycle and destroyed only when the activity is killed. This may ensure that a user is connected to a session throughout the entire time the user is on call.

In some embodiments, a screen recorder may be initialized based on this concept. However, in some embodiments, the screen recorder may only be held when it is used and released immediately once recording is stopped and a video is saved. This may ensure that there are no unnecessary resources held in the main thread of an application, leaving more space for the call process and other features which are allocated only when needed.

In some embodiments, a recorded video may be shared through firebase which uploads videos on a background thread. This may minimize memory usage on the main thread.

In some embodiments, for editing videos, an android port of the FFMPEG library may be used which executes on a background thread. This may also minimize memory usage. Furthermore, since these processes are all on background threads, memory which is held by them may be released immediately when the respective process is completed.

In some embodiments, one or more lifecycle includes cleanup of variables, objects, the required services, and the like. In some embodiments, such a step is a cleanup step. The cleanup step can reclaim memory, reduce resource usage, and the like. The cleanup step can also ensure that no dangling references remain that could cause memory leaks. It also ensures that any resources that are no longer needed are properly released. Database for storing the layers (individually or in ordered [stacked] combination)

In some embodiments, during recording of a layer, one or more memory cycles occur. In some embodiments, the recording of a layer can be divided into a number of memory cycles. In some embodiments, a memory cycle can be initiated when a certain amount of data has been recorded. In some embodiments, a memory cycle can be initiated when a certain amount of time has elapsed. In some embodiments, a memory cycle can be initiated when a certain number of recordings have been made. In some embodiments, a memory cycle can be initiated when a certain amount of system resources have been utilized. In some embodiments, a memory cycle can be initiated when a certain condition has been met. The memory management sub-module monitors memory status relative to the memory cycles and initiates a memory cycle when the conditions for initiating a memory cycle have been met. Moreover, the memory management sub-module, as described herein, monitors and releases memory as needed to ensure that system resources are used efficiently and to prevent memory leaks. Memory cycling and management, in some embodiments, occurs on a task-by-task and/or layer-by-layer basis, while in other embodiments it occurs on a system-wide basis. In some embodiments, a combination of task-by-task and/or layer-by-layer and/or system-wide cycling and monitoring occurs.

The layer management module receives input from the user devices and/or the peripherals and initiates, manipulates, terminates, or otherwise augments one or more layers of the lesson in response to the input. The input may be received from a user interface, such as a graphical user interface (GUI), a command line interface (CLI), or an application programming interface (API). In some embodiments, the input is received from one or more sensors associated with the user devices and/or peripherals. The layer management module utilizes the memory management sub-module to track and utilize the total system memory, the utilized system memory, the available system memory, and the expected memory utilization of variables, objects, services required for each layer, and the like. The layer management module mallocs and frees space for new variables and objects as needed based on the current state of the lesson at hand. The layer management module further utilizes data from the sensors to determine when to initiate one or more layers and when to terminate one or more layers based on specific conditions being met.

Additionally, In some embodiments, in-session messaging is provided. In some embodiments, this is a message center. In some embodiments, the message center enables written communication between users. In some embodiments, the message center enables users to submit/exchange notes, pictures, video clips, and the like to one another. In some embodiments, a user is able to edit or mark-up one or more of the items in the messaging center, such as by providing mark-up lines on a picture sent by a different user, and returning the marked-up version to the messaging center. In some embodiments, the message center enables users to submit/exchange notes, pictures, video clips, and the like to one another. In some embodiments, a user is able to edit or mark-up one or more of the items in the messaging center, such as by providing mark-up lines on a picture sent by a different user, and returning the marked-up version to the messaging center.

Advantageously, the platform serves as a convenient system and method for golfers to receive virtual lessons. Additionally, the platform serves as a convenient, user friendly platform for instructors to build their brand and client base, as well as increase income. The system and method provides the same conveniences for professional instructors, allowing the instructors to fill scheduling gaps at the office through the platform or by conducting virtual lessons from the comfort of their own couch. The system and method provide the flexibility for instructors to make the decision on how much they want to expand their business/income and gives them the flexibility to do it wherever and whenever they choose.

In some embodiments, the platform includes ball-tracing functions to follow and visualize the flight of a golf ball to aid in instruction. In some embodiments, the platform analyzes and provides statistics regarding the swing of a golfer. In some embodiments, multiple golfer users participate in a group lessons, where one instructor addresses multiple golfer users utilizing the aforementioned layers. The group lessons, in some embodiments, are scheduled in advance and one or more user is enabled to attend the group lesson for an access fee. Users that do not attend the group lesson may access a recorded version of the group lesson for a second, different access fee.

Various embodiments of the computer program, system, and method of embodiments of the present invention are implemented in hardware, software, firmware, or combinations thereof, which broadly comprises server devices, computing devices, and a communications network. Various embodiments of the server devices include computing devices that provide access to one or more general computing resources, such as Internet services, electronic mail services, data transfer services, and the like. In some embodiments the server devices also provides access to a database that stores information and data, with such information and data including, without limitation, account information, NLU model information, campaign information, personality information, or other information and data necessary and/or desirable for the implementation of the computer program, system, and method of the present invention, as will be discussed in more detail below.

Various embodiments of the server devices and the computing devices include any device, component, or equipment with a processing element and associated memory elements. In some embodiments the processing element implements operating systems, and in some such embodiments is capable of executing the computer program, which is also generally known as instructions, commands, software code, executables, applications (apps), and the like. In some embodiments the processing element includes processors, microprocessors, microcontrollers, field programmable gate arrays, and the like, or combinations thereof. In some embodiments the memory elements are capable of storing or retaining the computer program and in some such embodiments also store data, typically binary data, including text, databases, graphics, audio, video, combinations thereof, and the like. In some embodiments the memory elements also are known as a "computer-readable storage medium" and in some such embodiments include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements, in some embodiments the server devices further include file stores comprising a plurality of hard disk drives, network attached storage, or a separate storage network.

Various embodiments of the computing devices specifically include mobile communication devices (including wireless devices), work stations, desktop computers, laptop computers, palmtop computers, tablet computers, portable digital assistants (PDA), smart phones, wearable devices and the like, or combinations thereof. Various embodiments of the computing devices also include voice communication devices, such as cell phones or landline phones. In some preferred embodiments, the computing device has an electronic display, such as a cathode ray tube, liquid crystal display, plasma, or touch screen that is operable to display visual graphics, images, text, etc. In certain embodiments, the computer program of the present invention facilitates interaction and communication through a graphical user interface (GUI) that is displayed via the electronic display.

The GUI enables the user to interact with the electronic display by touching or pointing at display areas to provide information to the user control interface, which is discussed in more detail below. In additional preferred embodiments, the computing device includes an optical device such as a digital camera, video camera, optical scanner, or the like, such that the computing device can capture, store, and transmit digital images and/or videos.

In some embodiments the computing devices includes a user control interface that enables one or more users to share information and commands with the computing devices or server devices. In some embodiments, the user interface facilitates interaction through the GUI described above or, in other embodiments comprises one or more functionable inputs such as buttons, keyboard, switches, scrolls wheels, voice recognition elements such as a microphone, pointing devices such as mice, touchpads, tracking balls, styluses. Embodiments of the user control interface also include a speaker for providing audible instructions and feedback. Further, embodiments of the user control interface comprise wired or wireless data transfer elements, such as a communication component, removable memory, data transceivers, and/or transmitters, to enable the user and/or other computing devices to remotely interface with the computing device.

In various embodiments the communications network will be wired, wireless, and/or a combination thereof, and in various embodiments will include servers, routers, switches, wireless receivers and transmitters, and the like, as well as electrically conductive cables or optical cables. In various embodiments the communications network will also include local, metro, or wide area networks, as well as the Internet, or other cloud networks. Furthermore, some embodiments of the communications network include cellular or mobile phone networks, as well as landline phone networks, public switched telephone networks, fiber optic networks, or the like.

Various embodiments of both the server devices and the computing devices are connected to the communications network. In some embodiments server devices communicate with other server devices or computing devices through the communications network. Likewise, in some embodiments, the computing devices communicate with other computing devices or server devices through the communications network. In various embodiments, the connection to the communications network will be wired, wireless, and/or a combination thereof. Thus, the server devices and the computing devices will include the appropriate components to establish a wired or a wireless connection.

Various embodiments of the computer program of the present invention run on computing devices. In other embodiments the computer program runs on one or more server devices. Additionally, in some embodiments a first portion of the program, code, or instructions execute on a first server device or a first computing device, while a second portion of the program, code, or instructions execute on a second server device or a second computing device. In some embodiments, other portions of the program, code, or instructions execute on other server devices as well. For example, in some embodiments information is stored on a memory element associated with the server device, such that the information is remotely accessible to users of the computer program via one or more computing devices. Alternatively, in other embodiments the information is directly stored on the memory element associated with the one or more computing devices of the user. In additional embodiments of the present invention, a portion of the information is stored on the server device, while another portion is stored on the one or more computing devices. It will be appreciated that in some embodiments the various actions and calculations described herein as being performed by or using the computer program will actually be performed by one or more computers, processors, or other computational devices, such as the computing devices and/or server devices, independently or cooperatively executing portions of the computer program.

A user is capable of accessing various embodiments of the present invention via an electronic resource, such as an application, a mobile "app," or a website. In certain embodiments, portions of the computer program are embodied in a stand-alone program downloadable to a user's computing device or in a web-accessible program that is accessible by the user's computing device via the network. For some embodiments of the stand-alone program, a downloadable version of the computer program is stored, at least in part, on the server device. A user downloads at least a portion of the computer program onto the computing device via the network. After the computer program has been downloaded, the program is installed on the computing device in an executable format. For some embodiments of the web-accessible computer program, the user will simply access the computer program via the network (e.g., the Internet) with the computing device.

Figure 6:
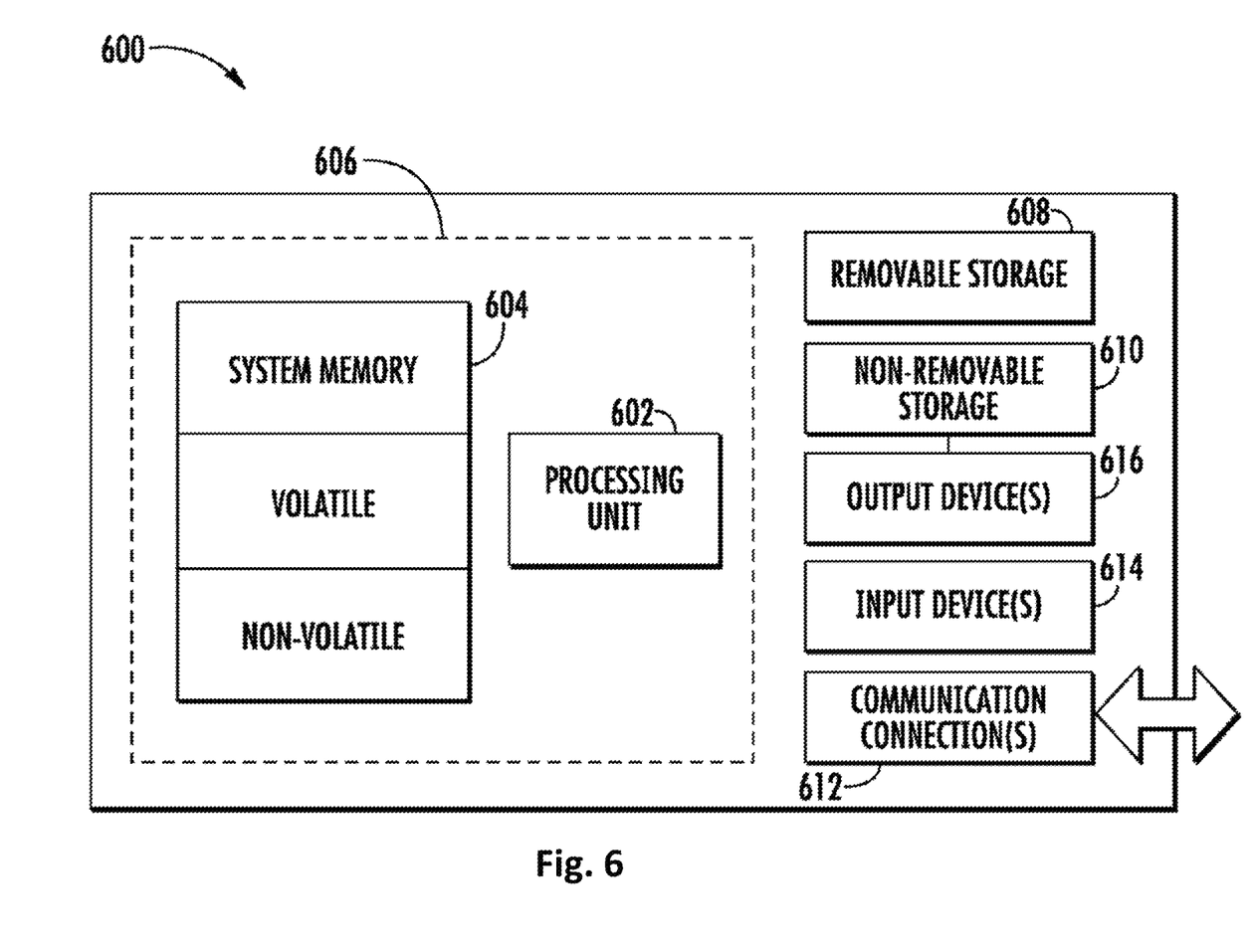
FIG. 6 is a diagram of a system hardware, according to some embodiments of the present invention.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of tangible computer readable media. Computer readable media can be any available tangible media that can be accessed by device 600 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of facilitating instruction. The method also includes initiating a communication between at least two users, the communication being a video stream being displayed on a plurality of displays in real-time; initiating a recording of said communication, thereby creating a first layer; capturing a second recording during the first layer, thereby creating a second layer; editing said second layer, thereby creating a third layer; and integrating said third layer into said first layer. Other embodiments of this aspect include corresponding computer systems, apparatus, and computer programs recorded on one or more computer storage devices, each configured to perform the actions of the methods.

Implementations may include one or more of the following features. The method may include ending said first layer after integrating said third layer into said first layer and saving one or more file for each the first layer, the second layer, and the third layer. Said first layer is uninterrupted from said initiation until said ending. The starting, stopping, rewinding, and further editing occur during the uninterrupted first layer. The method may include performing one of the following steps after integrating said third layer into said first layer and prior to ending said first layer: starting said third layer; stopping said third layer; rewinding said third layer; further editing said third layer. Said second layer represents a portion of said first layer. Said editing includes: accessing a file stored in a first database; performing a transformation of the file, the transformation including one or more of, marking-up said second layer, rearranging the order of one or more frames of said second layer, adjusting a magnification of the second layer at one or more timestamp, and adjusting a playback speed of one or more frames of said second layer, and saving said file in said first database. Each of the plurality of displays is associated with a mobile device, each mobile device including a camera, and where at least one of the cameras is utilized to initialize at least part of the first layer. Implementations of the described techniques may include hardware, a method or process, or computer software on a computer-accessible medium.

One general aspect includes a non-transitory computer-readable medium storing a training program including instructions that. The non-transitory computer-readable medium also includes initiate a communication between at least two users, the communication being a video stream being displayed on a plurality of displays in real-time; initiate a recording of said communication, thereby creating a first layer; capture a second recording during the first layer, thereby creating a second layer; edit said second layer, thereby creating a third layer; and integrate said third layer into said first layer. Other embodiments of this aspect include corresponding computer systems, apparatus, and computer programs recorded on one or more computer storage devices, each configured to perform the actions of the methods.

Implementations may include one or more of the following features. The non-transitory computer-readable medium further storing instructions to end said first layer after integrating said third layer into said first layer and save one or more file for each the first layer, the second layer, and the third layer. Said first layer is uninterrupted from said initiation until said ending. The non-transitory computer-readable medium further storing instructions to perform one of the following steps after integrating said third layer into said first layer and prior to ending said first layer: starting said third layer; stopping said third layer; rewinding said third layer; further editing said third layer. Said second layer represents a portion of said first layer. Said recording said communication includes: accessing a file stored in a first database; performing a transformation of the file, the transformation including one or more of, marking-up said second layer, rearranging the order of one or more frames of said second layer, adjusting a magnification of the second layer at one or more timestamp, and adjusting a playback speed of one or more frames of said second layer, and saving said file in said first database. Each of the plurality of displays is associated with a mobile device, each mobile device including a camera, and where at least one of the cameras is utilized to initialize at least part of the first layer. Implementations of the described techniques may include hardware, a method or process, or computer software on a computer-accessible medium.

One general aspect includes a method of providing instruction. The method also includes a) providing a platform to two or more users, the platform serving to store, transfer, and augment data which serves to facilitate an on-demand, live lesson; b) initiating the lesson through the platform, the platform instructing one or more user to begin the lesson; c) initiating a first layer, the first layer recording the lesson; d) initiating a second layer, the second layer recording a golfer's swing or body position; e) sharing the second layer recording with the golfer while the first layer is on-going; f) editing the secondary layer recording and providing a third layer, the third layer being a mark-up; g) sharing the second layer recording and the third layer mark-up with the golfer while maintaining the live video call; and h) saving the entire lesson as a lesson layer, the lesson layer being recorded during the entirety of the lesson. Other embodiments of this aspect include corresponding computer systems, apparatus, and computer programs recorded on one or more computer storage devices, each configured to perform the actions of the methods.

Implementations may include one or more of the following features. The method where the platform includes a layer management module, the method may include manipulating one or more of the first, second, and third layers, said manipulation occurring via a processor coupled to a memory, the memory containing non-transitory machine-readable code. The machine-readable code of the layer management module includes code for initiating, manipulating, terminating, or augmenting one or more of said layers, said code being executed by the processor. The layer management module includes a memory management sub-module, the method may include: a) dynamically identifying which system processes are required for the proper functioning of one or more active layer and which are not; and b) selectively killing, starting, or modifying the priority of one or more system processes as necessary to free up additional memory. Implementations of the described techniques may include hardware, a method or process, or computer software on a computer-accessible medium.

The invention claimed is:

1. A method of facilitating instruction, the method comprising:
providing a platform to two or more users, the platform configured to facilitate an on-demand, live session between two or more mobile devices and including a layer management module;
initiating a communication between said two or more users, the communication being a video stream being displayed on a plurality of displays associated with said two or more mobile devices in real-time;
initiating a first live recording of said communication, thereby creating a first layer;
capturing a second live recording during said first live recording, thereby creating a second layer;
selectively displaying said second layer within said first layer;
editing said second layer, thereby creating a third layer;
integrating said third layer into said first layer; and
the layer management module manipulating one or more of the first layer, the second layer, and the third layer, said manipulation occurring via a processor coupled to a memory, the memory containing non-transitory machine-readable code;
wherein the machine-readable code comprises code for initiating, manipulating, terminating, or augmenting one or more of said layers, said code being executed by the processor;
wherein the layer management module includes a memory management sub-module;
the memory management sub-module dynamically identifying which system processes are required for the proper functioning of one or more active layer of said live session between said two or more mobile devices and which are not required; and
the memory management sub-module selectively killing, starting, or modifying the priority of one or more system processes as necessary to free up additional memory while maintaining said proper functioning of said one or more active layer of said live session between said two or more mobile devices.

2. The method of claim 1, further comprising ending said live session after integrating said third layer into said first layer and saving one or more file for each of the first layer, the second layer, and the third layer.

3. The method of claim 2, wherein said first layer is uninterrupted from said initiation until said ending.

4. The method of claim 3, further comprising the steps:
starting said third layer;
stopping said third layer;
rewinding said third layer; and
further editing said third layer,
wherein the starting, stopping, rewinding, and further editing occur during the uninterrupted first layer.

5. The method of claim 2, further comprising performing one of the following steps after integrating said third layer into said first layer and prior to ending said live session:
starting said third layer;
stopping said third layer;
rewinding said third layer; and
further editing said third layer.

6. The method of claim 1, wherein said second layer represents a portion of said first layer.

7. The method of claim 1, wherein said editing includes:
accessing a file stored in a first database;
performing a transformation of the file, the transformation including one or more of:
marking-up said second layer,
rearranging the order of one or more frames of said second layer,
adjusting a magnification of the second layer at one or more timestamp, and
adjusting a playback speed of one or more frames of said second layer; and
saving said file in said first database.

8. The method of claim 7, wherein each mobile device includes a camera, and wherein at least one of the cameras is utilized to initialize at least part of the first layer.

9. The method of claim 1, wherein said on-demand, live session comprises an on-demand, live golf lesson.

10. A non-transitory computer-readable medium storing a training program including a layer management module and instructions that, when executed by a processor, causes a server connected to a first mobile device and a second mobile device through first and second communication interfaces, respectively, to:
initiate a live session comprising a communication between at least two users, the communication being a video stream being displayed on a plurality of displays associated with said first mobile device and said second mobile device in real-time;
initiate a first live recording of said communication, thereby creating a first layer;
capture a second live recording during said first live recording, thereby creating a second layer;
selectively display said second layer within said first layer;
edit said second layer, thereby creating a third layer; and
integrate said third layer into said first layer;
wherein said layer management module is configured to manipulate one or more of the first layer, the second layer, and the third layer via said processor;
wherein the layer management module includes a memory management sub-module configured to dynamically identify which system processes are required for the proper functioning of one or more active layer of said live session and which are not required; and wherein the memory management sub-module selectively killing, starting, or modifying the priority of one or more system processes as necessary to free up additional memory while maintaining said proper functioning of said one or more active layer of said live session.

11. The non-transitory computer-readable medium of claim 10, further storing instructions to end said live session after integrating said third layer into said first layer and save one or more file for each the first layer, the second layer, and the third layer.

12. The non-transitory computer-readable medium of claim 11, wherein said first layer is uninterrupted from said initiation until said ending.

13. The non-transitory computer-readable medium of claim 12, further storing instructions to perform one of the following steps after integrating said third layer into said first layer and prior to ending said live session:
starting said third layer;
stopping said third layer;
rewinding said third layer; and
further editing said third layer.

14. The non-transitory computer-readable medium of claim 10, wherein said second layer represents a portion of said first layer.

15. The non-transitory computer-readable medium of claim 10, wherein said recording said communication includes:
accessing a file stored in a first database;
performing a transformation of the file, the transformation including one or more of:
marking-up said second layer,
rearranging the order of one or more frames of said second layer,
adjusting a magnification of the second layer at one or more timestamp, and
adjusting a playback speed of one or more frames of said second layer; and
saving said file in said first database.

16. The non-transitory computer-readable medium of claim 15, wherein each mobile device includes a camera, and wherein at least one of the cameras is utilized to initialize at least part of the first layer.

17. A method of providing instruction, comprising:
providing a platform to two or more users, the platform serving to store, transfer, and augment data which serves to facilitate an on-demand, live lesson between two or more mobile devices, wherein the platform includes a layer management module;
initiating the live lesson through the platform, the platform instructing one or more user to begin the live lesson;
initiating a first layer comprising a first live recording of the live lesson;
initiating a second layer comprising a second live recording during said first live recording and selectively displaying said second layer within said first layer on a plurality of displays associated with said two or more mobile devices, the second live recording showing at least one user's swing or body position;
sharing the second layer with at least one user while the first layer is on-going;
editing the second layer to create a third layer, the third layer being a mark-up;
sharing the second layer and the third layer with at least one user while maintaining the first layer;
the layer management module manipulating one or more of the first layer, the second layer, and the third layer, said manipulation occurring via a processor coupled to a memory, the memory containing non-transitory machine-readable code;
upon completion of said live lesson, saving a complete lesson layer, the complete lesson layer being recorded during the entirety of the live lesson;
wherein the machine-readable code comprises code for initiating, manipulating, terminating, or augmenting one or more of said layers, said code being executed by the processor;
wherein the layer management module includes a memory management sub-module;
the memory management sub-module dynamically identifying which system processes are required for the proper functioning of one or more active layer of said live lesson and which are not required; and
the memory management sub-module selectively killing, starting, or modifying the priority of one or more system processes as necessary to free up additional memory while maintaining said proper functioning of said one or more active layer of said live lesson.

18. The method of claim 17, wherein the memory management sub-module is configured to monitor the system for changes in memory status and to provide information regarding such changes to the layer management module.

* * * * *